J. E. BROGDON.
CENTER PIN.
APPLICATION FILED MAY 28, 1915.
1,152,285.
Patented Aug. 31, 1915.
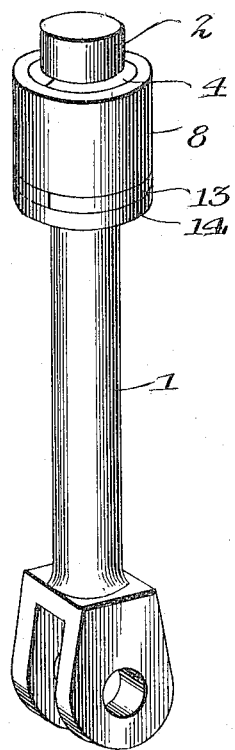
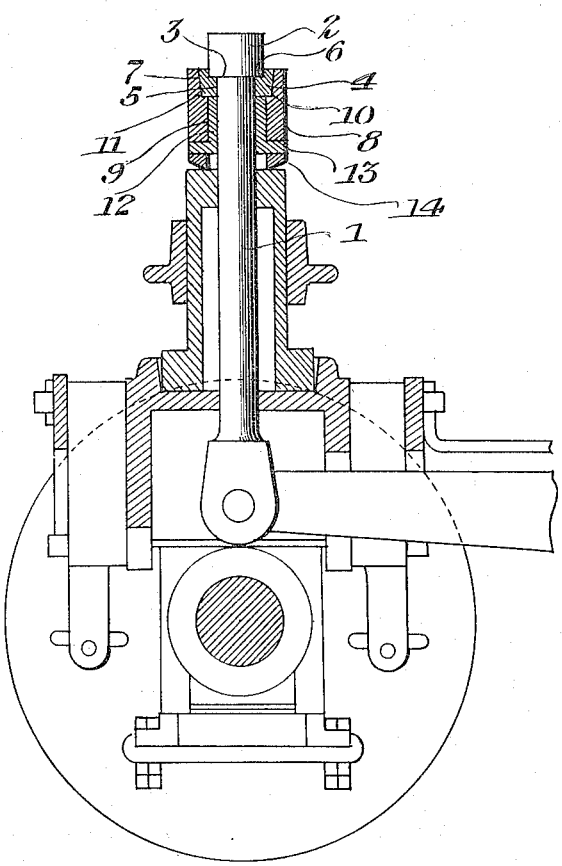
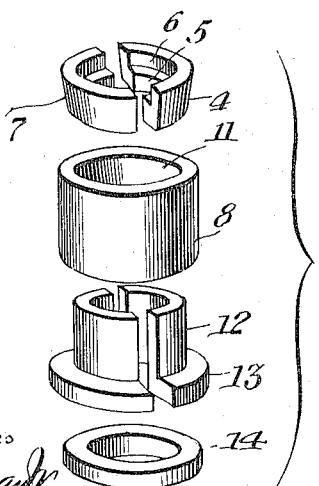
Inventor
J. E. Brogdon
Witnesses
By Victor J. Evans
Attorney

UNITED STATES PATENT OFFICE.

JOEL E. BROGDON, OF MONTGOMERY, ALABAMA, ASSIGNOR OF ONE-FOURTH TO A. H. ARRINGTON, OF MONTGOMERY, ALABAMA.

CENTER-PIN.

1,152,285.  Specification of Letters Patent.  Patented Aug. 31, 1915.

Application filed May 28, 1915. Serial No. 31,025.

*To all whom it may concern:*

Be it known that I, JOEL E. BROGDON, a citizen of the United States, residing at Montgomery, in the county of Montgomery and State of Alabama, have invented new and useful Improvements in Center-Pins, of which the following is a specification.

The invention is directed to a center pin designed for use with pony trucks, and involves a construction whereby the stripping of the pin in use is effectively prevented and other disadvantages of the old style of pin overcome.

The improved pin is constructed for self-adjustment at the top of the center casting of the pony truck, and constructing the pin with a view to causing it to carry the proportion of weight of the locomotive which the pony truck is designed to support.

The invention in the preferred form of details will be described in the following specification, reference being had particularly to the accompanying drawings, in which:

Figure 1 is a perspective view of the improved pin. Fig. 2 is a vertical section of the same in place. Fig. 3 is a perspective view of the parts connected with the pin proper, showing such parts in spaced relation.

The improved pin comprises a pin proper 1, otherwise the usual form and construction, having an enlarged head 2. The juncture of the pin proper and head provides a shoulder 3 at the base of the head, and the pin proper beneath the head is engaged by a washer made up of several parts. The washer includes what may be termed a collar washer split in two or more parts to embrace the pin, said collar washer 4 having a main bore 5 to engage the pin proper and an enlarged or counter bore 6 to receive a portion of the head of the pin. The collar washer is beveled on its outer surface as at 7, and is seated in a sleeve 8 having a main bore 9 exceeding the diameter of and encircling the pin below the collar washer, and a counter bore 10 to receive the collar washer, the counter bore being arranged at the upper end of the sleeve and having a bevel wall 11 to coöperate with the bevel wall 7 of the collar washer. The bore 9 of the sleeve is of sufficient diameter to permit the passage of the head of the pin therethrough and the excess space between the pin proper and the inner surface of the sleeve. A flange bushing 12 is fitted between the pin proper and interior wall of the sleeve, having a lateral or flange extension 13 underlying the sleeve. The flange bushing is preferably split for obvious application. A bevel washer 14 is secured beneath the lateral flange of the bushing, said washer 14 being beveled on the underside as clearly shown.

In the use of the improved center or king pin it will be obvious that when weight is placed upon a pin the bevel washer permits the pin to swing comparatively free and to adjust itself at the top of the center casting of the pony truck. Furthermore when weight is placed upon the pin, the bevel formation of the sleeve and collar washer causes the latter to grip the pin more closely, thereby preventing displacement. The extension of the collar washer above the lower end with the head of the pin prevents said head from shelling off in use.

What is claimed is:

1. A center pin having a head, a collar washer embracing the pin and head and a sleeve into which said washer is fitted, said washer and sleeve having beveled coöperation to cause the collar washer to grip the parts of the pin under downward pressure on the pin.

2. A center pin having a head, a collar washer embracing the pin and head and a sleeve into which said washer is fitted, a bushing arranged between the sleeve and pin below the washer, and a beveled washer arranged to encircle the pin below the bushing.

3. A center pin having a head, a sleeve having a main bore of a size to permit the passage of the head therethrough, a collar washer embracing the head and pin and fitting in the sleeve, said sleeve bore being enlarged to receive the washer, and a bevel washer arranged at the lower end of the sleeve.

4. A center pin having a head, a sleeve having a main bore of a size to permit the passage of the head therethrough, a collar washer embracing the head and pin and fitting in the sleeve, said sleeve bore being enlarged to receive the washer and a bevel washer arranged at the lower end of the sleeve, and a split bushing fitting the pin within the sleeve and below the collar washer.

In testimony whereof I affix my signature in presence of two witnesses.

JOEL E. BROGDON.

Witnesses:
A. H. ARRINGTON,
T. B. GISSENDANER.

Copies of this patent may be obtained for five cents each, by addressing the "Commissioner of Patents, Washington, D. C."